(12) United States Patent
Matheisl et al.

(10) Patent No.: US 9,944,497 B2
(45) Date of Patent: Apr. 17, 2018

(54) SYSTEM AND METHOD FOR MONITORING A TRANSPORT OF A PASSENGER TRANSPORTATION DEVICE OR TRANSPORT UNIT

(71) Applicant: Inventio AG, Hergiswil (CH)

(72) Inventors: Michael Matheisl, Vösendorf (AT); Esteban Marks, Zürich (CH); Thomas Novacek, Schwechat (AT)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 15/526,494

(22) PCT Filed: Nov. 3, 2015

(86) PCT No.: PCT/EP2015/075622
§ 371 (c)(1),
(2) Date: May 12, 2017

(87) PCT Pub. No.: WO2016/074997
PCT Pub. Date: May 19, 2016

(65) Prior Publication Data
US 2018/0002143 A1    Jan. 4, 2018

(30) Foreign Application Priority Data
Nov. 12, 2014   (EP) ..................... 14192843

(51) Int. Cl.
*B66B 29/00*   (2006.01)
*G01P 1/00*   (2006.01)
(Continued)

(52) U.S. Cl.
CPC ............ *B66B 29/005* (2013.01); *G01P 1/127* (2013.01); *G07C 5/006* (2013.01); *G07C 5/085* (2013.01); *G01D 9/005* (2013.01)

(58) Field of Classification Search
CPC ....... B66B 29/005; B66B 5/087; B66B 5/093; G01P 1/127; G07C 5/006; G07C 5/085; G01D 9/005
See application file for complete search history.

(56) References Cited

U.S. PATENT DOCUMENTS 5,701,257 A    12/1997 Miura et al.
6,267,219 B1   7/2001 Spannhake et al.
(Continued)

FOREIGN PATENT DOCUMENTS

CN    102556792 A    7/2012
DE    19832341 A1    1/2000
(Continued)

*Primary Examiner* — Mark A Deuble
(74) *Attorney, Agent, or Firm* — William J. Clemens; Shumaker, Loop & Kendrick, LLP (57) ABSTRACT

A transport-monitoring module for monitoring a transport of a transport unit of a passenger-transportation device is arranged on the transport unit. The transport-monitoring module has a sensor and localization devices. During the transport, through an interface unit, a connection with a data memory of the device is created. The interface unit is configured so that transport-monitoring data that are to be stored, which are based on sensor data of the sensor and localization data of the localization devices, are permanently stored in the data memory. In this way, the transport-monitoring module is simplified, so that it is no longer an item that is worth stealing. In addition, a reliable access to the stored transport-monitoring data after the end of the transport is secured.

14 Claims, 2 Drawing Sheets

(51) Int. Cl.
   *G07C 5/00*     (2006.01)
   *G01P 1/12*     (2006.01)
   *G07C 5/08*     (2006.01)
   *G01D 9/00*     (2006.01)

(56) References Cited

U.S. PATENT DOCUMENTS

| | | |
|---|---|---|
| 6,748,305 B1 | 6/2004 | Klausner et al. |
| 9,440,820 B2 * | 9/2016 | Sullivan ............... B66B 31/00 |
| 2004/0094366 A1 | 5/2004 | Weinberger et al. |
| 2007/0216133 A1 * | 9/2007 | Klein ................... B66B 31/00 |
| | | 280/404 |
| 2007/0257781 A1 | 11/2007 | Denson |
| 2011/0224868 A1 | 9/2011 | Collings, III et al. |

FOREIGN PATENT DOCUMENTS

| | | |
|---|---|---|
| DE | 29919782 U1 | 5/2001 |
| DE | 10007285 A1 | 8/2001 |
| DE | 102006010159 A1 | 9/2007 |
| DE | 102010044735 A1 | 3/2012 |
| DE | 102012105884 A1 | 1/2014 |
| EP | 0673531 A1 | 9/1995 |
| JP | 2010189162 A | 9/2010 |
| WO | 0151895 A1 | 7/2001 |

* cited by examiner

Fig. 1

2 TRANSPORT-MONITORING MODULE
16 CONTROL
17 DATA MEMORY
25 DRIVE UNIT

Fig. 2

2 TRANSPORT-MONITORING MODULE
16 CONTROL
17 DATA MEMORY
25 DRIVE UNIT

Fig. 3

SYSTEM AND METHOD FOR MONITORING A TRANSPORT OF A PASSENGER TRANSPORTATION DEVICE OR TRANSPORT UNIT

FIELD

The invention relates to a system which has a transport-monitoring module, which serves to monitor a transport of a passenger-transportation device, or of a transport unit as part of a passenger-transportation device, and a method for monitoring a transport of a passenger-transportation device, or of a transport unit. In particular, the invention relates to the field of transport-monitoring for passenger-transportation devices that are transported whole or dismantled into one or more transport units.

BACKGROUND

From DE 198 32 341 A1, a method and a device for registering acceleration values of transported goods are known. From this, it is known that the division of relatively long transport routes into a plurality of sections, for example into road, air, sea, and rail sections, makes the subsequent identification of the point-in-time, or of the section, at which a possible damage of a transported good occurred, difficult and inadequate. Also, in the case of sensitive transported goods, considerable damage can occur, which afterwards may possibly not be immediately externally detectable. The effects of a defect caused by a dynamic influence may possibly only be detected months after the delivery. The known solution registers acceleration values in three spatial axes, and the values that are measured by sensor are processed electronically and stored if the amount of the registered acceleration value exceeds a predefined limit value. For a temporally later reconstruction, an item of time information from a real-time clock is stored together with each stored value or at regular intervals.

The device that is known from DE 198 32 341 A1, and the known method, have the disadvantage that the device for monitoring is elaborately embodied and correspondingly costly. In particular, for data processing and storage, a microcontroller is provided. Further, operating and display elements are connected to the microcontroller. The value of the device presents an incentive to steal it during the transport. Furthermore, also during a transport, for example over a plurality of transport sections, and generally involving a plurality of parties, in the event of external influences that could result in transport damages, there is an incentive to steal such a device or even to manipulate the stored data. A further problem results from the device for registering shocks normally being removed after the transport in order for it to be used for a further transport. For example, in the event of defects occurring only months after delivery, in order still to have proof, a correspondingly elaborate, seamless, transport-data security is necessary, the data must be read out and, for example, stored centrally in a database of the manufacturer or owner of the transport good.

SUMMARY

An object of the invention is to create a system with a transport-monitoring module, and a method for monitoring a transport, which have an improved structure and/or an improved manner of functioning. In particular, it is an object of the invention to propose a system with a transport-monitoring module, and a method for monitoring a transport, which enable an inexpensive embodiment of the transport-monitoring module and/or an improved reliability of the data capture and/or data storage and/or a simplified data capture and/or data storage.

These objects are fulfilled by a system which has a passenger-transportation device and at least one transport-monitoring module, which transport-monitoring module, at least during the transport of the passenger-transportation device from its dispatch location to its destination location, can be arranged thereon. The dispatch location can be, for example, the manufacturing location, or manufacturing facility, at which the passenger-transportation device was manufactured. Further, the dispatch location can also be a storage location at which the passenger-transportation device is temporarily stored. In the event of returns to the manufacturing facility, the dispatch location is logically the location at which the passenger-transportation device was assembled. The destination location can be a temporary store, a built structure of the future operator of the passenger-transportation device, or, as stated above, in the case of returns, also the manufacturing facility. The passenger-transportation device is embodied as an escalator, a moving walk, or an elevator. Occasionally, for the purpose of simpler transport, large or long passenger-transportation devices are also divided into two or more parts, into so-called transport units. Consequently, the transport-monitoring module can also be assigned to a transport unit that is a part of a passenger-transportation device.

The transport-monitoring module has at least one sensor. Moreover, the transport-monitoring module has an interface unit through which, at least during a transport of the passenger-transportation device or of the transport unit, a connection of the transport-monitoring module with a data memory of the passenger-transportation device can be created. The interface unit is embodied in such manner that transport-monitoring data that are to be stored, which are based at least partly on sensor data of the at-least one sensor, can be permanently stored in the data memory of the passenger-transportation device. The data memory is so arranged as to remain permanently in the passenger-transportation device. The sensor data can particularly be acceleration data, temperature data, air humidity data, and suchlike.

Although the transport unit and/or the passenger-transportation device is/are not components(s) of the transport-monitoring module according to the invention, at least temporarily during the transport phase, together with the latter, they form a system. For the purpose of monitoring the transport of a passenger-transportation device that is divided into a plurality of transport units, one or more transport-monitoring modules can serve. If necessary, the transport-monitoring module can also be arranged on only one transport unit of the passenger-transportation device. For example, a control of the passenger-transportation device which contains the data memory can be contained in a transport unit, while other transport units of the passenger-transportation system contain no such data memory. Since the most sensitive transport unit is normally the one with the control, arranging the transport-monitoring module in this transport unit, and connecting it with the data memory of the control, enables monitoring of the most sensitive transport unit in particularly advantageous manner. The other transport units are normally transported with the same transport means as the most sensitive transport unit, for example in a container, and correspondingly experience the same transport stresses.

Hence, the transport-monitoring module can, in advantageous manner, be readied independent of the passenger-transportation device that is to be transported. After a transport, the transport-monitoring module can be removed and used for a further transport. When doing so, a data backup is not necessary, since the sensor data that are registered by the transport-monitoring module are written as transport-monitoring data to the data memory of the passenger-transportation device already during the transport. By this means, sources of error are also excluded. In particular, the requirement for a prompt data backup after the transport is obviated, since the transport-monitoring data can be permanently written to the data memory.

A further advantage is that, in the event of a malfunction, or an inspection, or a maintenance service, of the passenger-transportation device, the permanently stored transport-monitoring data can be displayed to a maintenance service technician. Hence, the transport-monitoring data are available to the maintenance service technician directly at the location of the passenger-transportation device without further outlay. By this means, the maintenance service technician obtains in simple manner the possibility to refer to the transport-monitoring data for his assessment of a malfunction or suchlike. The identification of a defect that results, for example, from an outwardly not immediately identifiable influence at some past point-in-time during the transport, is therefore substantially simplified and possibly only then practically possible.

A further advantage is that, in the data memory of the passenger-transportation device, the permanently stored original transport-monitoring data are available. This avoids transmission errors, copying errors, errors in the assignment of the data to the respective passenger-transportation device, and similar errors or sources of error. In particular, a manipulation of the stored transport-monitoring data is hindered or completely prevented. For example, during the transport, if necessary the transport-monitoring module is locatable and then accessible. However, the data memory of the passenger-transportation device can be built into the passenger-transportation device virtually inaccessibly. Hence, at least during the transport, an unauthorized physical or electrical accessing of the data memory can be virtually ruled out.

The passenger-transportation device of the system is an escalator, a moving walk, or an elevator system. The escalator or moving walk is normally completely assembled in the manufacturing facility and, thereafter, depending on its length, either as a whole or divided into a plurality of escalator modules or moving-walk modules, packed and then shipped worldwide. In the present description, escalator modules or moving-walk modules, as well as crates containing elevator components of an elevator system, that are ready for shipping, are referred to as "transport units". Along the transport route, for example through blows, falls, or tipping, transport damages to packed transport units, or to passenger-transportation systems that are packed whole, can occur.

When a transport damage occurs, by means of the analysis of the recorded transport-monitoring data, for example the point-in-time of the occurrence of the damage can be determined. Hence, the shipper that caused the damage, and/or its liability insurance, can be held liable. Particularly critical with regard to damage are components such as a drive, an escalator control, or a moving-walk control, and switching elements that are normally all arranged in the same escalator section or moving-walk section. In the case of elevator systems, for example, it is the transport unit with the associated car control and motor control. By this means, an advantageous monitoring of the transport, particularly of escalators, moving walks, and elevator components, is possible.

Since the transport-monitoring module need not contain a storage unit or a computer unit, the former can be embodied less expensively, thereby making it less attractive for thieves. A computer program for the capture and storage of the sensor data, or of the transport-monitoring data, can hence be stored in the control of the passenger-transportation device and executed by the control. It is therefore advantageous for the passenger-transportation device to have a control which contains the data memory, and for the control to be embodied in such manner that, at least during the transport, a data capture of the sensor data by the at-least one sensor is performed.

Provided that at least a localization device is present in the transport-monitoring module, the capture of the localization data can also be initialized by the aforesaid computer program and controlled by the control device. In addition, the computer program can contain program steps which provide for a transmission of the sensor data, and possibly also the localization data, through the interface unit of the transport-monitoring module to the control of the passenger-transportation device, and a subsequent storage of the transport-monitoring data in the data memory of the control.

Also advantageous is for the interface unit of the transport-monitoring module to have a connecting element at which, via a releasable connector, the interface unit can be connected at least indirectly with the data memory of the passenger-transportation device. The connection can take place directly or indirectly. An indirect connection is possible, for example, via a suitable cable, or also via a wireless connection, such as, for example, Bluetooth. This allows a flexible arrangement of the transport-monitoring module relative to the data memory, or a control with the data memory. In some circumstances, a direct connection can also be of advantage. For this purpose, for example, on the control a suitable connecting element and/or a suitable receptacle can be provided, in order to directly connect the transport-monitoring module. By this means, by means of a pluggable connection, the interface unit can be physically connected in advantageous manner with the data memory of the passenger-transportation device.

Also advantageous is for an energy accumulator to be provided in the transport-monitoring module which, at least during the transport, supplies the at-least one sensor, and/or the interface unit, and/or at least one further device of the transport-monitoring module, with electrical energy. By this means, if necessary, the energy accumulator of the transport-monitoring module can supply also the control of the passenger-transportation device with energy, in order to enable the program execution of the aforesaid computer program for monitoring the transport. The interface unit is then embodied in such manner that, in addition to a data transmission, also an energy transmission is enabled. The energy accumulator can be an accumulator, a battery, a capacitor with great capacity, or other suchlike.

Also advantageous is for a spatial localization device to be provided in the transport-monitoring module, which generates the localization data relating to a spatial localization. Such a spatial localization device can, for example, be based on a satellite navigation system for civil and military purposes, such as GPS. Additionally, or alternatively, it is advantageous for a temporal localization device to be provided, which generates the localization data with regard to a relative and/or absolute temporal localization. Such a temporal localization device can, for example, be based on the reception of a global time. A relative temporal localization can, however, be realized independent of the reception of a global time. A suitable combination of the said possibilities is also conceivable, for the purpose of generating the transport-monitoring data that are to be stored.

By this means, in advantageous manner, the transport-monitoring data that are to be stored can be based on the sensor data of the at-least one sensor as well as on spatial localization data of the spatial localization device and/or temporal localization data of the temporal localization device. The said sensor can be embodied as a three-axis acceleration sensor. Self-evidently, for example, also two two-axis acceleration sensors can be used.

By this means, a transport-monitoring module can be created, which has at least one sensor and an interface unit. Preferably, such a transport-monitoring module also has an energy accumulator, since otherwise the energy supply would have to take place from the passenger-transportation device, in particular from an escalator control, a moving-walk control, or an elevator control. However, such controls generally have no, or no adequate, energy accumulator.

After the transport, the transport-monitoring module is preferably separated from the passenger-transportation device, in particular from a control of the passenger-transportation device. The removed transport-monitoring module can then be sent back to the manufacturing facility for further uses. The computer program that is required for data capture can be stored in the control of the passenger-transportation device. Such a computer program can proceed in suitable manner. In particular, a program process can be predefined in which the available energy and the storage capacity of the data memory are optimally utilized. For example, a resting mode (sleep mode, standby mode), and the capture of occurrences above a defined threshold value, can be realized in order to optimize the process.

Hence, the transport-monitoring module itself can be embodied as highly unattractive for a thief, since the parts contained therein, such as an energy accumulator and a sensor, are not items that are worth stealing. The stored transport-monitoring data are also not easily separated from the transported item itself by removal of the transport-monitoring module. The permanently stored data in the data memory of the passenger-transportation system can rather be connected over the entire lifetime with the passenger-transportation device and called up by a service technician at any time. Thus, also effects that manifest themselves very much later, of incidents that occurred during the transport between the dispatch location and the destination location, can be correctly interpreted.

A system for monitoring a transport of a passenger-transportation device, or of a transport unit, from its dispatch location until its destination location, or installation location, always comprises at least a transport-monitoring module and a passenger-transportation device, or a transport unit of a passenger-transportation device.

The passenger-transportation device has a control and a data memory. When the passenger-transportation device has been installed at its destination location, this control serves as control for the relevant movement processes of the passenger-transportation device, or of the escalator, moving walk, or elevator system. According to the invention, however, this control and the data memory are used not only to operate the passenger-transportation device but also for the permanent storage of the transport data.

At least during the transport, the capture of the sensor data of the at-least one sensor, the transmission of the sensor data through the interface unit of the transport-monitoring module to the control, the conversion of the sensor data into transport-monitoring data, and the storage of the transport-monitoring data in the data memory, are controlled by the control. For this purpose, already at the manufacturing facility, a computer program can be stored in the control. It is, however, also possible for the transport-monitoring module to have an inexpensive non-volatile memory, for example a ROM, EPROM, EEPROM, or suchlike, in which the computer program is stored and which can be called up and loaded by the control as soon as the transport-monitoring module is connected with the control through the interface unit. Self-evidently, a non-volatile memory, such as a random access memory, can also be used to store the computer program if an energy accumulator is present in the transport-monitoring module.

Given the presence of at least one localization device, its localization data can also be called up by the control through the interface unit of the transport-monitoring module. The localization data can then be assigned by the control to the sensor data and processed.

If no localization device is provided, the sensor data that are received by the control can be provided with at least a sequential numbering, in order to preserve at least the correct sequence of the stressful incidents.

The data that are processed by the control, which are based at least partly on sensor data of at least one sensor of the transport-monitoring module, can be permanently stored in the data memory as transport-monitoring data.

A method for monitoring a transport of a passenger-transportation device, or of a transport unit as part of a passenger-transportation device, from its dispatch location to its destination location, can contain the following steps:

In the manufacturing facility, a transport-monitoring module according to the invention is arranged on the passenger-transportation device or on its transport unit.

At least during a transport, a connection of the transport-monitoring module with a data memory of the passenger-transportation device via an interface unit of the transport-monitoring module is created.

Transport-monitoring data, which are based at least partly on sensor data of at least one sensor of the transport-monitoring module, are permanently stored in the data memory of the passenger-transportation device and are thereafter available at all times, since the data memory remains permanently arranged in the passenger-transportation device.

Self-evidently, such a method can contain further steps, in that, for example, after the transport, transport-monitoring data that are stored in the data memory of the passenger-transportation device are read out, and, depending on the transport-monitoring data that are read out, it is determined and output whether a return of the passenger-transportation device or its transport unit to the manufacturing facility, a request for repair material, or an installation of the passenger-transportation device, is recommendable.

The method can further contain the steps that after the transport, the transport-monitoring module is removed, and, after the removal of the transport-monitoring module, the transport-monitoring data remain permanently stored in the data memory of the passenger-transportation device, and at least in the event of a malfunction of the passenger-transportation device, and/or an inspection or maintenance service of the passenger-transportation device, an output of the transport-monitoring data from the data memory, which takes place at least on request, takes place.

The removed transport-monitoring module can subsequently be transported to a further passenger-transportation device, or to a further transport unit as part of a passenger-transportation device, and then arranged on the further passenger-transportation device and/or transport unit to monitor the transport of the further passenger-transportation device and/or transport unit.

There is, however, also the possibility that the transport-monitoring module, after the transport and the installation of the passenger-transportation device, remains in the passenger-transportation device and thereafter serves to register critical vibrations that act on the passenger-transportation device. Such critical vibrations that detract from trouble-free operation can be, for example, seismic vibrations, if the passenger-transportation device is installed and operated in an earthquake area. The critical vibrations can, however, also occur during the installation and/or servicing of the passenger-transportation device. Furthermore, critical vibrations can also be caused by users of the passenger transportation device, if, for example, vandals in an elevator car of a passenger-transportation device jump and/or swing.

DESCRIPTION OF THE DRAWINGS

Preferred exemplary embodiments of the invention are explained in more detail in the attached drawings, in which identical elements are referenced with identical numbers. Shown are in FIG. 1: a system with a transport-monitoring module and a transport unit of a passenger-transportation device in a diagrammatic representation according to a possible embodiment of the invention.

DETAILED DESCRIPTION

Figure 1:
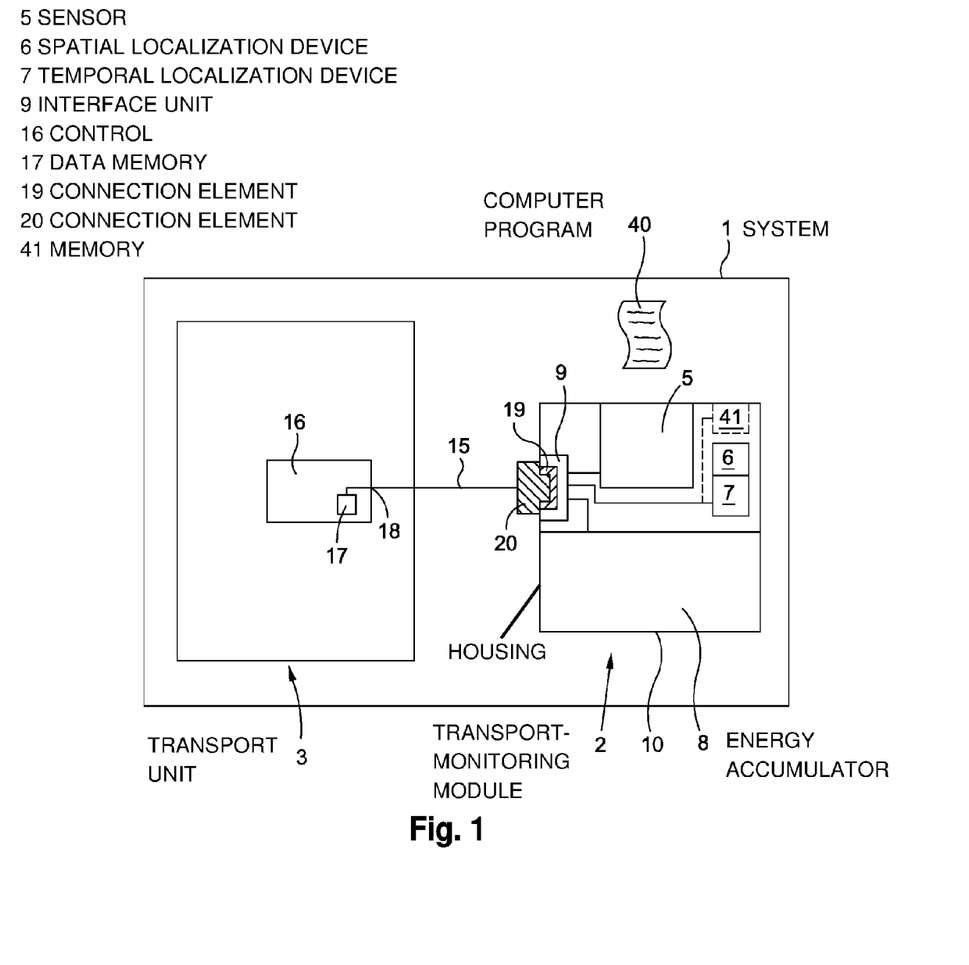

FIG. 1 shows a system 1 with a transport-monitoring module 2 and a transport unit 3 of a passenger-transportation device 4 (FIGS. 2 and 3) in a diagrammatic representation according to a possible embodiment of the invention. The passenger-transportation device 4 can be embodied as an escalator 4, a moving walk 4, or an elevator 4.

The transport-monitoring module 2 has at least one sensor 5. In this exemplary embodiment, the sensor 5 is embodied as a three-axis acceleration sensor 5. Alternatively or additionally, other sensor types, for example a temperature sensor and/or a humidity sensor, can also form part of the transport-monitoring module 2. In addition, the transport-monitoring module 2 contains a spatial localization device 6 and a temporal localization device 7. Further, an energy accumulator 8 is provided, which stores electrical energy and can be embodied as, for example, a battery 8, accumulator 8, or capacitor 8. Furthermore, an interface unit 9 of the transport-monitoring module 2 is provided, which is electrically connected with the sensor 5, the localization device 6, 7, and the energy accumulator 8. The sensor 5, the localization device 6, 7, the energy accumulator 8, and the interface unit 9, can be arranged inside a common housing 10 of the transport-monitoring module 2.

In this exemplary embodiment, a connector cable 15 is provided, which can have a plurality of independent conductors and/or strands. The transport unit 3 has a control 16 with a data memory 17. Self-evidently, the data memory 17 can also be arranged at a distance from the control 16 in the transport unit 3. Irrespective of its arrangement in the transport unit 3 and/or in the passenger-transportation device 4, the data memory 17 is writable by the control. In this exemplary embodiment, the interface unit 9 is connected with the data memory 17 via the connector cable 15. By this means, the transport-monitoring module 2 can also be arranged at a distance from the data memory 17 and/or a respective connection point 18 on the control 16, which serves to connect the connector cable 15.

In a modified embodiment, the connector cable 15 can also be obviated if the control 16 and the transport-monitoring module 2 have a wireless connection, as, for example, a Bluetooth connection or suchlike. However, by comparison with a physical connection by means of a connection cable 15, the wireless connection is currently somewhat expensive.

Furthermore, a direct contact can also be created between the interface unit 9 and the connection point 18 on the control 16 of the passenger-transportation device 4. The transport-monitoring module 2 is then near to the data memory 17 and/or to the connection point 18.

The interface unit 9 has a connection element 19. The connection element 19 can, for example, be embodied as a connection socket 19. Further, provided on the connector cable 15 is a connection element 20, which can be embodied as, for example, a connection plug 20.

The connection plug 20 of the connector cable 15 is inserted into the connection socket 19 of the interface unit 9. By this means, the connection elements 19, 20, are releasably connected with each other. Thus, at its connection element 19, via a releasable, pluggable connection 19, 20, by means of the connector cable 15, the interface unit 9 is indirectly connected with the data memory 17 of the passenger-transportation device 4. By this means, a physical connection of the interface unit 9 with the data memory 17 is given. An interference in a transmission, as is possible in the event of a poor wireless connection, is thereby prevented.

The energy accumulator 8 supplies the sensor 5, the localization device 6, 7, and the interface unit 9 with electrical energy. By this means, via the connector cable 15, an energy transport, if necessary in both directions, can also be made possible. The energy accumulator 8 can then also at least partly supply the control 16 with energy and provide the energy that is required to store transport-monitoring data in the data memory 17. By this means, with the energy from the energy accumulator 8, also the execution of a computer program, in particular a control and/or transport-monitoring program in the control 16, can be secured. As soon as the passenger-transportation device 4 is installed and its control 16 is connected with a power-supply network of the building, the energy accumulator 8, for example via the interface unit 9, can also be charged with electrical energy before the transport-monitoring module 2 is removed.

The localization device 6, 7, and the control 16, therefore represent further devices which, at least during the transport, can be supplied with electrical energy from the energy accumulator 8.

During the transport, the sensor 5 generates sensor data, in particular acceleration data and/or acceleration values. Further, the spatial localization device 6 generates localization data regarding a spatial localization of the transport-monitoring module 2. The temporal localization device 7 generates localization data regarding a relative and/or an absolute temporal localization. Hence, through the reception of a suitable time signal, an absolute temporal localization is possible. A relative temporal localization can be realized by a quartz clock with date function or also by a simple pulse-generator. Such a pulse-generator can, for example, count forwards, accurate to the second or minute, during the transport. A combination of the said possibilities is also conceivable. Thereby, for example in the case of reception faults, through a relative temporal localization, a continuation of the clock time can be achieved.

The interface unit 9 is embodied in such manner that transport-monitoring data that are to be stored, which are based on sensor data of the sensor 5 and the localization data of the localization devices 6, 7, can be permanently stored in the data memory 17 of the passenger-transportation device 4. Moreover, a selection can be made to determine which transport-monitoring data are to be accumulated. For example, in suitable manner, limit values for the sensor data of the sensor 5 can be defined. Depending on the sensor 5 that is used, such sensor data can be, for example, acceleration data, humidity data, temperature data, and suchlike. If, for example, only sensor data are stored that exceed a certain limit value, this represents a substantial data reduction. Further, localization data can be written essentially simultaneously with sensor data. Then, corresponding data pairs of sensor data and localization data are written to the data memory 17. However, staggered data storage is also possible. For example, at certain times or at certain places, localization data can be written to the data memory 17 and, independent thereof, in between, sensor data can be written, when, for example, a predefined limit value is exceeded. Such an ordered listing of the sensor data and localization data as transport-monitoring data in the data memory 17 enables a quite accurate subsequent reconstruction of the transport process.

By this means, transport-monitoring data that are to be stored can be based on the sensor data of the at-least one sensor 5 as well as on spatial localization data of the spatial localization device 6 and temporal localization data of the temporal localization device 7. In particular, by this means, a reliable assignment of external influences, such as shocks, vibrations, and impacts, to the correspondingly responsible parties that are involved in the transport of the goods, is made possible. Furthermore, based on the permanent storage of the transport-monitoring data in the data memory 17, an access to these transport-monitoring data at a later point-in-time can be made possible.

Following the arrival and the required installation of the passenger-transportation device 4, if necessary, with the aid of the control 16, the transport-monitoring data that are stored in the data memory 17 can be read out. Depending on the transport-monitoring data that are read out, an output can then take place. This output can indicate whether a return of the passenger-transportation device 4, or of the transport unit 3, is necessary. This can be the case, for example, if, based on the sensor data, correspondingly strong effects, in particular high accelerations, have been registered. Since, in that case, a verification of the functional capability in the manufacturing facility may be necessary. It can also be shown whether repair material must be requested. Depending on the severity of the influences, also a measurement of the passenger-transportation device 4 and a straightening, for example, of the truss, tracks, or guiderails, or suchlike, at the installation location and/or on the jobsite, may be necessary.

Furthermore, in the event of moderately strong environmental influences, an exchange of parts of the passenger-transportation device 4, in particular of the control 16 itself, may be sufficient. In the ideal case, it can be indicated that an installation of the passenger-transportation device 4 is recommendable. The execution of this method therefore has substantial advantages regarding the decision as to which measures should be taken. Hence, possible damages can be taken into account, which are externally only detectable with difficulty, or inadequately, and may possibly only later result in defects.

Moreover, in the event of a malfunction of the passenger-transportation device 4, or in the event of a maintenance service of the passenger-transportation device 4, at least at the request of a service technician, the transport-monitoring data from the data memory can be called up and output. The service technician can do this, for example, by means of his maintenance service instrument, mobile telephone, or laptop. Hence, a service technician can access the transport-monitoring data on site and without inconvenient queries. Hence, by this means, the connection between a malfunction of the passenger-transportation device 4 with incidents and/or influences that occurred during the transport, can be established. Hence, also defects from dynamic influences, which possibly only occur a long time after delivery, can still be detected and proved. This also simplifies the search for faults, if necessary. Self-evidently, the transport data can also be read out from the data memory 17 and, as a second backup, written, for example, to an external database or to a USB stick. It is, however, advantageous, if the transport data remain stored in the data memory 17 and are preferably provided with a deletion protection.

Since the transport-monitoring module 2 is independent of the passenger-transportation device 4 and the transport unit 3, the transport-monitoring module 2 can be re-used without significant delay. Hence, it is possible for the transport-monitoring module 2, which has been removed from the passenger-transportation device 4, to be transported to a further transport unit 3 and then to be assigned to the further transport unit 3 for monitoring its transport.

The data capture of the sensor data of the sensor 5, and the localization data of the localization devices 6, 7, can, during the transport, take place in advantageous manner by the control 16. For data capture, the control 16 preferably uses a computer program 40, which can preferably be stored in the data memory 17 of the control 16. Optionally, and therefore indicated with a broken line, the computer program 40 can also be stored in a small, preferably non-volatile, memory 41, which is arranged in the transport-monitoring module 2. The control 16 communicates with the non-volatile memory 41 also through the interface unit 9. The data capture can, for example, be started automatically, if the computer program 40 takes the form of an executable file.

Further, by this means, the control 16 can also control the transmission of the sensor data and of the localization data through the interface unit 9 of the transport-monitoring module and the storage of the transport-monitoring data, which are based on the sensor data and the localization data, in the data memory 17. A simple construction of the transport-monitoring module 2 is thereby possible. The control 16 can thus permanently store the transport-monitoring data in the data memory 17.

Figure 2:
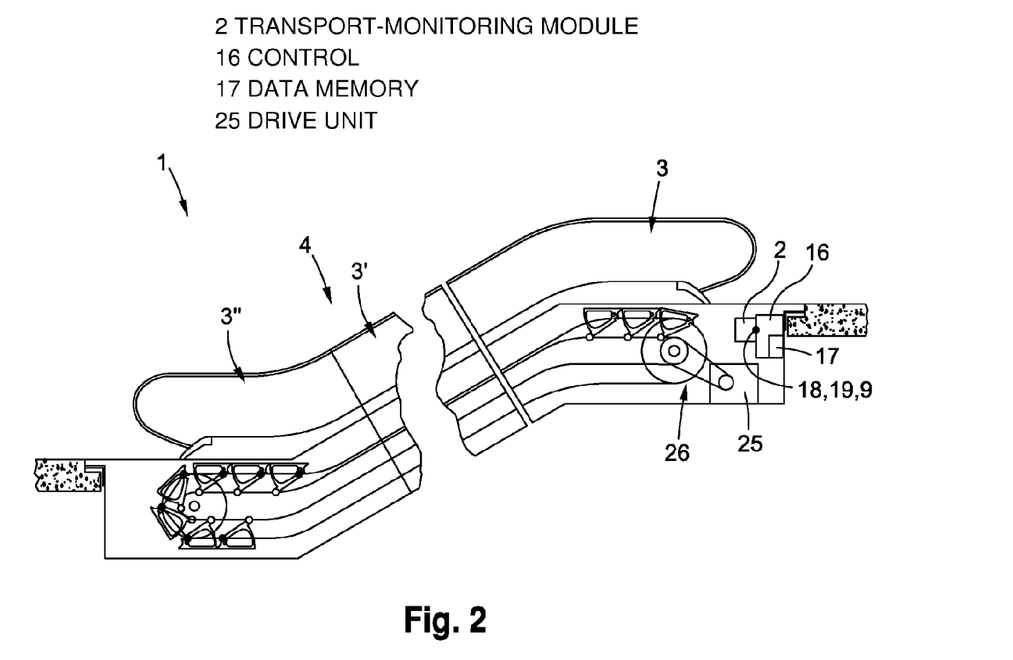
FIG. 2: a system with a transport-monitoring module, and a transport unit of a passenger-transportation device which is embodied as an escalator, in a partial diagrammatic representation according to a first exemplary embodiment of the invention.

FIG. 2 shows a system 1 with a transport-monitoring module 2 and with a passenger-transportation device 4 in a partial diagrammatic representation corresponding to a first exemplary embodiment. In this exemplary embodiment, the passenger-transportation device 4 is embodied in the form of an escalator 4. Depending on its size, the said escalator 4 can be packed and transported in one piece, or in several parts, and therefore in several transport units 3, 3',3". For greater clarity, the transport unit 3 is shown separated from the rest of the escalator 4, and/or from the second transport unit 3' and the third transport unit 3" and unpacked. Further, FIG. 2 shows the passenger-transportation device 4 supported at both ends in recesses, such as are present, for example, in buildings. The recesses can, however, also be transport mountings that are, for example, arranged in a container in order to support the escalator 4 during the transport.

The transport unit 3, in which the control 16 is located, is particularly sensitive to possible effects, such as impacts and falls. For this reason, arranged at least on the transport unit 3 with the control 16, is a transport-monitoring module 2. In this exemplary embodiment, the transport-monitoring module 2 is arranged directly on the control 16. By this means, the connection element 19 of the interface unit 9 of the transport-monitoring module 2 can be so embodied that a direct connection with the control 16 at the connection point 18 is possible. The connector cable 15 is thereby obviated.

In this exemplary embodiment, the transport unit 3, in which the control 16 is located, is so embodied that, in the vicinity of the control 16, a drive unit 25 with a transmission drive 26 is located. The drive unit 25 can have, for example, an electric motor and a drive. The transmission drive 26 can be embodied as, for example, a chain drive 26, a belt drive 26, a transmission gear 26 or a reduction gear 26. The also sensitive drive unit 25 is thereby also monitored by the transport-monitoring module 2. Hence, through a constructive embodiment of the passenger-transportation device 4, a monitoring of the sensitive components, in particular of the control 16 and of the drive unit 25, can take place.

Preferably, as represented in FIG. 2, until completion of the installation in the building, the transport-monitoring module 2 is left in the system 1 and only removed when the installation is complete and commissioning of the escalator has taken place. Hence, incidents that occur during the installation of the escalator 4 in the building, or built structure, can also be registered.

Figure 3:
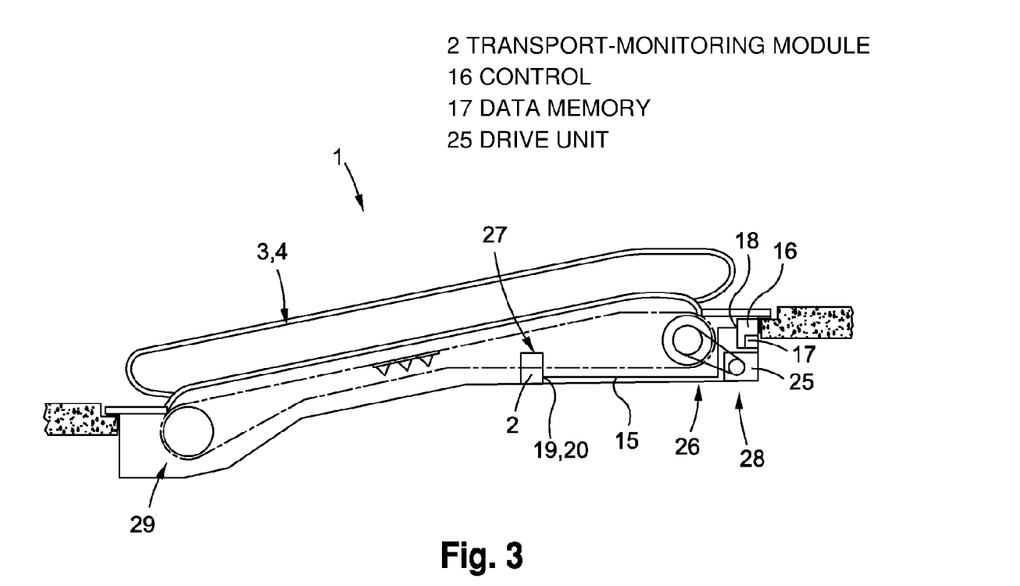
FIG. 3: a system with a transport-monitoring module, and a transport unit of a passenger-transportation device which is embodied as a moving walk, in a partial diagrammatic representation according to a second exemplary embodiment of the invention.

FIG. 3 shows a system 1 with a transport-monitoring module 2 and a passenger-transportation device 4 in a partial diagrammatic representation corresponding to a first exemplary embodiment. The passenger-transportation device that is shown is a moving walk 4. In this exemplary embodiment, the passenger-transportation device 4 is embodied so short that a transport as a whole is possible. A division into transport units is therefore not necessary. The transport-monitoring module 2 is fastened at a suitable point 27 of the passenger-transportation device 4. The point 27 is so selected that, on the one hand, influences at one end 28, at which the control 16 and the drive unit 25 are located, can be reliably detected, and, on the other hand, also influences at another end 29, which is far distant from the control 16 and the drive unit 25, can still be detected and recorded to a sufficient extent.

Both in the first exemplary embodiment, which is described by reference to FIG. 2, and also in the second exemplary embodiment, which is described by reference to FIG. 3, a removal of the transport-monitoring module 2 can take place after the transport. The said removal of the transport-monitoring module 2 can take place immediately after the completed transport, since the transport-monitoring data have been written to the data memory 17. Thus, no special backup of the transport-monitoring data is necessary. This also simplifies the handling and rules out sources of error resulting from an otherwise possible incorrect handling.

The interface unit 9 can, in particular through an RS interface, a bus node, or suchlike, communicate with the control 16.

In addition, the transport-monitoring module 2 can also have further sensory or sensor functions. In particular, also the climatic conditions, in particular temperature, air pressure, air humidity, or suchlike, can also be registered.

Although the invention has been described through the presentation of specific exemplary embodiments, it is self-evident that, with knowledge of the present invention, numerous further embodiment variants can be created. For example, a plurality of interfaces can be present, through which the transport-monitoring module is connected with the data memory. Further, also a plurality of transport-monitoring modules can be arranged in a passenger-transportation device and/or in a transport unit as part of a passenger-transportation device, which, during the transport, are all connected with the data memory of the passenger-transportation device. Furthermore, the control can have more than one data memory. It is also possible that, for reasons of redundancy, a passenger-transportation device as disclosed in EP 1 777 192 B1 has more than one control. According to the invention, each of these controls, and/or their data memories respectively, can be connected with at least one transport-monitoring module. Moreover, in order to increase the theftproofness even further, signals and data can be transmitted in a specific format, or encrypted, so that the transport-monitoring module can only be used together with the computer program that is loaded in the control.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:
1. A system comprising:
    a passenger-transportation device embodied as an escalator, moving walk, or elevator; and
    at least one transport-monitoring module, that, during transport of the passenger-transportation device from a shipping location to a destination location, is arranged on the passenger-transportation device or on a transport unit as part of the passenger-transportation device, and, after the transport, is removable, and wherein the transport-monitoring module has at least one sensor, wherein the transport of the passenger-transportation device is performed by a shipping contractor, wherein the transport-monitoring module has an interface unit, through which, at least during the transport of the passenger-transportation device, a connection of the transport-monitoring module with a data memory of the passenger-transportation device is established, wherein the interface unit is configured such that transport-monitoring data that are to be stored, the data being based at least partly on sensor data of the at least one sensor, is permanently stored in the data memory of the passenger-transportation device, and the data memory remains permanently arranged in the passenger-transportation device.

2. The system according to claim 1 wherein the interface unit has a connecting element providing a releasable connection connecting the interface unit at least indirectly with the data memory of the passenger-transportation device.

3. The system according to claim 1 including a pluggable connection physically connecting the interface unit with the data memory of the passenger-transportation device.

4. The system according to claim 1 including an energy accumulator supplying, at least during the transport, at least one of the at least one sensor, the interface unit (9) and at least one further device with electrical energy.

5. The system according to claim 1 including at least one of a spatial localization device for generating localization data relating to a spatial localization, and a temporal localization device for generating localization data relating to at least one of a relative temporal localization and an absolute temporal localization, and the transport-monitoring data that are to be stored are based on the sensor data of the at least one sensor and on at least one of the spatial localization data and the temporal localization data.

6. The system according to claim 1 wherein the at least one sensor is a three-axis acceleration sensor.

7. The system according to claim 1 wherein the passenger-transportation device includes a control containing the data memory, and, at least during the transport, a registration of the sensor data of the at least one sensor, a transmission of the sensor data through the interface unit of the transport-monitoring module to the control, a conversion of the sensor data into transport-monitoring data, and the storage of the transport-monitoring data in the data memory, are controllable through the control.

8. The system according to claim 7 including at least one localization device generating localization data obtained by the control through the interface unit of the transport-monitoring module, and the localization data are assignable by the control to the sensor data.

9. The system according to claim 8 wherein the transport-monitoring data are permanently stored in the data memory of the control.

10. A method for monitoring a transport of a passenger-transportation device, or of at least one transport unit as part of the passenger-transportation device, from a shipping location to a destination location by a shipping contractor, wherein the passenger-transportation device is one of an escalator, a moving walk, or an elevator, comprising the steps of:

arranging at least one transport-monitoring module on the transport unit or on the passenger-transportation device;

at least during the transport, connecting the at least one transport-monitoring module with a data memory of the passenger-transportation device through an interface unit of the transport-monitoring module;

storing transport-monitoring data that is based at least partly on sensor data of at least one sensor of the transport-monitoring module permanently in the data memory of the passenger-transportation device; and linking the sensor data permanently with the passenger-transportation device by permanently arranging the data memory in the passenger-transportation device.

11. The method according to claim 10 wherein, after the transport, the transport-monitoring data that are stored in the data memory of the passenger-transportation device are read out and, depending on the transport-monitoring data that are read out, determined and output whether a return of the passenger-transportation device or its transport unit, or a request for repair material, or an installation of the passenger-transportation device, is recommendable.

12. The method according to claim 10 wherein, after the transport, the transport-monitoring module is removed, after the removal of the transport-monitoring module the transport-monitoring data remain permanently stored in the data memory of the passenger-transportation device, and, at least in an event of a malfunction of the passenger-transportation device or of a maintenance service of the passenger-transportation device, an output of the transport-monitoring data from the data memory, which takes place at least on request, takes place.

13. The method according to claim 12 wherein the removed transport-monitoring module is transported to a further passenger-transportation device, or to a further transport unit as part of the further passenger-transportation device, and then arranged on the further passenger-transportation device or further transport unit for monitoring transport of the further passenger-transportation device or the further transport unit.

14. The method according to claim 10 wherein, after the transport and an installation of the passenger-transportation device, the transport-monitoring module remains in the passenger-transportation device and thereafter serves for registration of critical vibrations that act on the passenger-transportation device.

* * * * *